Feb. 14, 1961  W. J. DORNHOEFER  2,972,097
REGULATED POWER RECTIFIER
Filed June 23, 1959  2 Sheets-Sheet 2

United States Patent Office

2,972,097
Patented Feb. 14, 1961

2,972,097

REGULATED POWER RECTIFIER

Warren J. Dornhoefer, deceased, late of Littleton, Mass., by Edna M. Dornhoefer, executrix, Littleton, Mass., assignor to The Warren Manufacturing Company, Inc., Littleton, Mass., a corporation of Massachusetts Filed June 23, 1959, Ser. No. 822,229

7 Claims. (Cl. 321—18)

This invention relates generally to self-regulating power rectifying apparatus for exacting constancy requirements, and in one of its particular but not exclusive aspects, to battery chargers for supplying floating voltage to central-office batteries in exchanges of communication systems.

More specifically, the invention concerns battery chargers and the like regulated power rectifiers that are exclusively composed of solid-state components, preferably including a power rectifier of the magnetic amplifier type controlled and regulated by means of transistors or other controllable semiconductor rectifier devices of the junction type. Such semiconductor-controlled power rectifiers have the advantage of utmost simplicity, extremely compact design, and minimum maintenance requirements. However, the power rectifiers of this type as heretofore available leave much to be desired as regards constancy and accuracy of regulating performance, due to the sensitivity of the internal semiconductor resistance to variations in temperature.

In theory, the resulting errors of voltage or current regulation can be minimized by various error-responsive compensating devices generally known for such purposes; but the addition of the known compensators renders the system more complicated, less reliable and is apt to increase the amount of maintenance work, thus obviating some of the fundamental advantages of a completely static power-rectifier system.

It is an object of the invention, therefore, to devise a battery charger or similar power rectifier exclusively composed of static or solid-state rectifying and control components in which the semiconductor-controlled regulating circuits will inherently compensate any voltage error due to variations in semiconductor temperature, thus affording the desired accuracy of regulating performance at a minimum of expense and space requirements while preserving all desired properties of the static equipment. Another object of the invention is to embody in such a system an automatic current-limit regulation, likewise without impairing the above-mentioned desired properties and performance of the static power-rectifying and regulating system.

According to the invention, a power rectifier system of the magnetic amplifier type has two control circuits of mutually differential operation connected to the two parallel branches of a constant sum-current network which is energized from the output voltage of the power rectifier and has the respective currents in its two branches controlled by a controllable semiconductor junction device, preferably a transistor, so as to maintain the output voltage of the power rectifier system at a given constant value, one of the semiconductor devices receiving a constant control voltage while the control voltage for the other is variable in dependence upon the rectifier output voltage to be regulated, it being essential that the two control-voltage supplying loop circuits of the respective semiconductor devices, including the temperature-sensitive internal semiconductor resistances, have substantially the same total resistances, as will be more fully described and explained hereinafter.

According to another feature of the invention, a third transistor or similarly controllable semiconductor device of the junction type is connected parallel to the one above-mentioned semiconductor device that receives variable control voltage; and the third semiconductor device, normally biased to be inactive, is controlled in response to the load current of the power rectifier to effect an overriding current-limit regulation of the power rectifier only when the load current exceeds a given value. As a result, the system is normally regulated for constant output voltage but becomes automatically current regulated in the event the load of the power rectifier goes beyond a desired limit.

The invention will be further described with reference to the embodiment of a battery charger for use in exchanges of communication systems, illustrated by way of example on the accompanying drawings in which.

Figure 1:
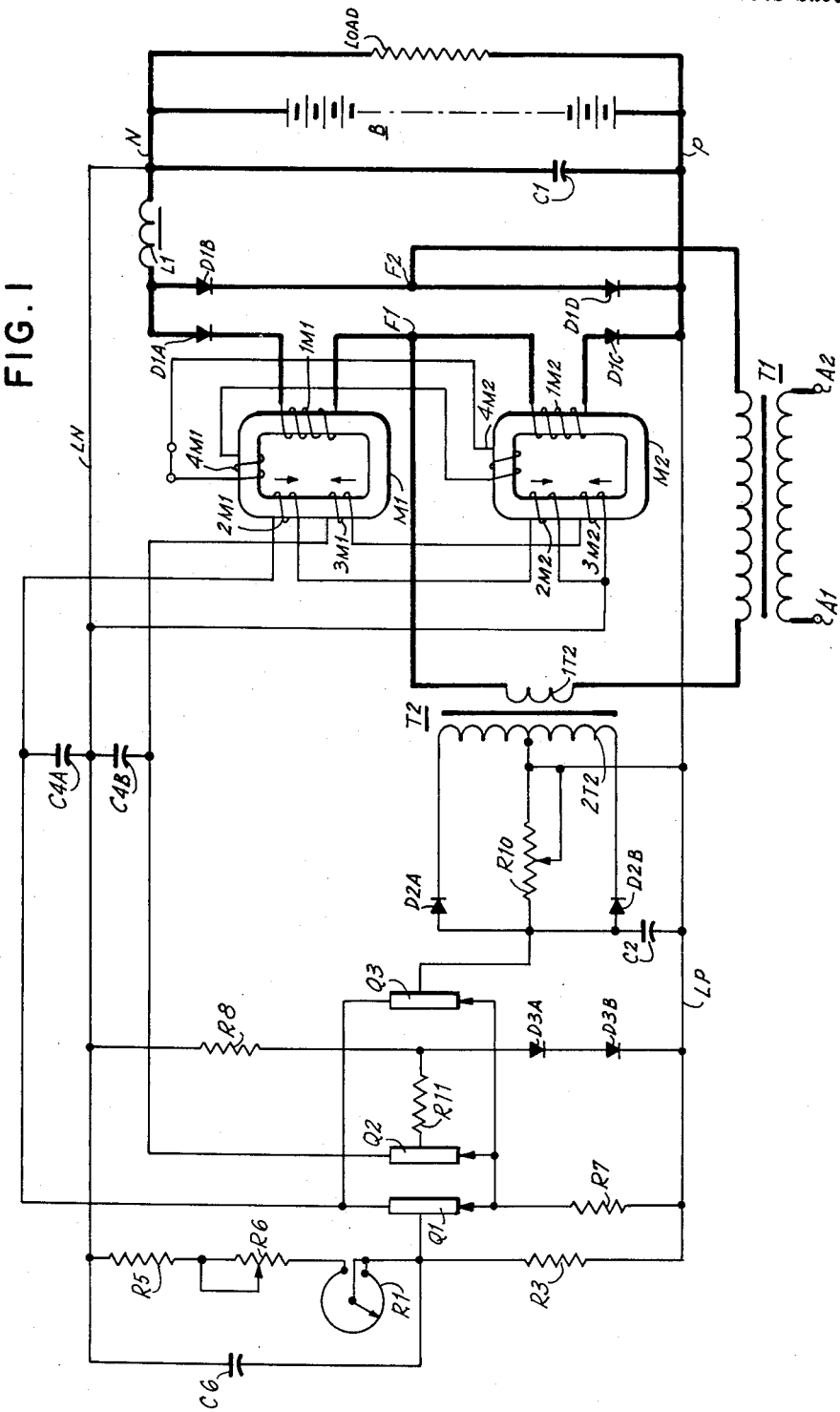
Fig. 1 is a schematic circuit diagram of the complete charger system.

The system illustrated in Fig. 1 serves to charge a battery B from a source of alternating power current by regulated, constant charging voltage. The alternating current is supplied to the terminals A1, A2 of a transformer T1 whose secondary winding is connected with the power input points F1, F2 of a magnetic amplifier bridge network which comprises the alternating-current windings 1M1, 1M2 of respective saturable reactors M1, M2, and four diode rectifiers D1A, D1B, D1C, D1D, consisting preferably of silicon power rectifiers. The rectified output of the amplifier bridge circuit is fed through a filter choke L1 into a capacitor bank C1. The combination of choke L1 and capacitor C1 forms a choke input filter. The filtered voltage is impressed across the positive bus P and the negative bus N of the charger.

Each reactor is provided with two direct-current control windings 2M1, 3M1 or 2M2, 3M2, and also with an auxiliary winding 4M1 or 4M2. During normal operation of the battery charger the auxiliary windings 4M1 and 4M2 are short-circuited in order to reduce the amount of A.-C. harmonic voltage which may appear across the control windings 2M1, 3M1 and 2M2, 3M2. This prevents large alternating current voltages from appearing across the collectors of the sum-network transistors described below.

The two control windings 2M1 and 2M2 are connected in a single direct-current control circuit in which the direction of current flow is such as to desaturate the magnetic amplifier, thus tending to lower the bus voltage. The windings 3M1 and 3M2 are connected in a second direct-current control circuit so traversed by current that the latter windings, when excited, operate in differential relation to the windings 2M1, 2M2, thus tending to increase the saturation of the magnetic amplifier and to increase the bus voltage. Capacitors C4a and C4b are connected across respective windings 2M1, 2M2 and 3M1, 3M2 to provide further protection against large voltages appearing on the collector circuits of the control transistors still to be described.

It will be understood that the magnetic amplifier system as such is essentially conventional and may be modified in the conventional manner. For example, while two separate saturable reactors M1, M2 are shown, both may be combined to a single reactor with a three-legged core on whose middle leg a single set of control windings is located. The novel features of the invention do not concern themselves with such details of the rectifying power system proper but relate to the associated regulating circuitry described presently.

The regulating circuits are excited by the charger bus voltage taken from across the buses P and N by respective positive and negative leads LP and LN. The control circuit which comprises the amplifier control windings 2M1, 2M2 extends from negative lead LN through a transistor Q1 and a resistor R7 to the positive lead PN. Similarly, the control circuit that comprises the amplifier control windings 3M1 and 3M2 extends from negative lead LN through a second transistor Q2 and the above-mentioned resistor R7 to the positive lead PN.

The two transistors Q1 and Q2 are matched and form part of a sum-current network that tends to maintain the sum of the two collector currents constant and equal to the current flowing through the common emitter resistor R7.

The base transistor Q2 is connected through a resistor R11 to a source of constant datum voltage. This source, in the illustrated embodiment, consists of two Zener silicon diodes D3A and D3B. The diodes D3A and D3B are connected in series with a resistor R8 between the positive and negative leads LP and LN. The diodes and the resistor R8 thus form a voltage divider in which the voltage drop across the two diodes is kept constant irrespective of variations in bus voltage of the battery charger. The Zener voltage, for example, is ten volts for a bus voltage of 48 volts.

The base of transistor Q1 is connected to another voltage divider which comprises resistors R3, R5 and R6, as well as a calibrating rheostat R1, in series between the bus leads LP and LN. A filter capacitor C6 is connected across the series group of resistors R5, R6 and R1. It will be recognized that when the bus voltage tends to vary, the bias potential at the base of transistor Q1 tends to vary accordingly.

The emitter-base voltages of transistors Q1 and Q2 are much smaller than the datum voltage across the Zener diodes D3A and D3B. While, as mentioned, the Zener diode voltage may have a total value of ten volts, the base-emitter voltages are only 0.1 to 0.2 volt. Thus the network must operate under normal balance conditions, namely when the charger output voltage has the desired correct value, so that the ten volt Zener voltage also appears substantially across the common emitter resistor R7 of both transistors. Under the same conditions, substantially the same Zener voltage of ten volts must also appear along the resistor R3. In other words, since the voltage drop of resistor R3 is directly proportional to the bus voltage of the battery, the voltage divider resistors R3, R1, R6 and R5 must be so rated that the voltage drop of resistor R3 is substantially equal to the Zener volts across diodes D3A and D3B when the bus voltage has the correct value, for example 48 volts. Typical parameters of the circuit components incorporating the just-mentioned rating, are the following correlated examples of values: R1=75 ohms; each of R3, R7, R10 and R11=100 ohms; R5=200 ohms; R6=105 ohms; R8=1200 ohms; C2=50 mfd.; C4A=.03 mfd.; C4B=.03 mfd.

Under normal, balanced conditions of the sum-current network, the collector currents flowing through the transistors Q1 and Q2 as well as through the two sets of control windings in the magnetic amplifier are equal, each being exactly one half of the current flowing through the common emitter resistor R7. When the bus voltage becomes excessive, the voltage across resistor R3 increases above 10 volts and the base of transistor Q1 is made more negative relative to the emitter, and the base of transistor Q2 becomes more positive relative to the emitter. This causes transistor Q1 to become more conductive and transistor Q2 to become less conductive, causing more current to flow through the collector circuit of transistor Q1 and the windings 2M1, 2M2, and less current to flow through the collector circuit of transistor Q2 and the windings 3M1, 3M2, the sum of the two currents being still constant but the respective shares of component currents being now unbalanced.

As mentioned, the collector current of Q1 causes the windings 2M1, 2M2 to lower the bus voltage, while the collector current of transistor Q2 excites the control windings 3M1, 3M2 in the sense required to increase the bus voltage. Consequently, the above-described increase in bus voltage causes the transistors Q1 and Q2 to control the magnetic amplifier so as to reduce the bus voltage. Conversely, if the bus voltage drops below the correct value, the transistor Q2 conducts more current than the transistor Q1 so that the control windings 3M1, 3M2 operate to increase the bus voltage.

As a result, the system tends to maintain the bus voltage at the correct value. However, a variation in internal resistance of the transistors Q1 and Q2, due to changes in temperature, would impair the accuracy of regulating performance if it were not for the provision of the properly dimensioned resistor R11 between the source of constant datum voltage and the base of transistor Q2, as will be described presently.

Figure 2:
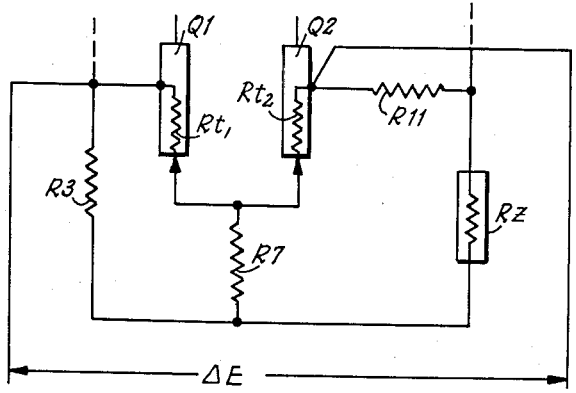
Fig. 2 illustrates schematically a portion of the regulating circuit components of the same system for the purpose of explanation.

For explaining the function of resistor R11 reference will be made to the diagram of Fig. 2, representing only the control circuits, namely the base-emitter circuits, of two transistors Q1 and Q2. Schematically indicated in Fig. 2 by resistance symbols $Rt_1$ and $Rt_2$ are the internal semiconductor resistances of the respective transistors. Also shown schematically at $Rz$ is the total dynamic resistance of the two Zener diodes D3A and D3B, this resistance being small in comparison with that of the voltage-divider resistor R3. It should be noted that the dynamic resistance $Rz$ of the Zener diodes is not a simple expression of the direct-current voltage (i.e. the Zener volts) divided by the total current through the Zener diodes, but is defined by the change in direct-current voltage divided by the change in Zener current through the diodes.

As is apparent from Fig. 2, the transistors Q1 and Q2 operate in such a manner that the error signal voltage $\Delta E$ is impressed across the respective bases of the two transistors. The error signal $\Delta E$ causes a current to flow from the base of one to the base of the other transistor through the impedance circuit connecting both bases.

Figure 3:
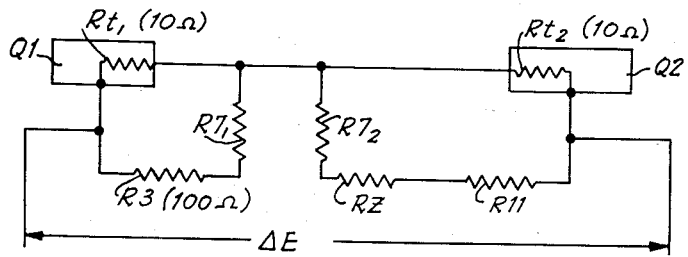
Fig. 3 is an explanatory substitute diagram for the same circuit.

Fig. 3 shows a first equivalent circuit in which the base-emitter impedance $Rt_1$ of transistor Q1 is shunted by the resistor R3 and by a resistor $R7_1$ which is looked upon as being a component of the resistor R7. Similarly, the base-emitter resistance $Rt_2$ of transistor Q2 is shunted by resistors $R7_2$, $Rz$ and R11.

Figure 4:
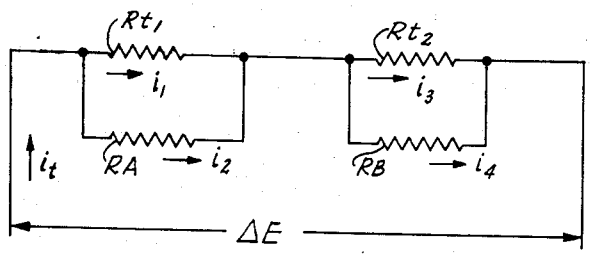
Fig. 4 is another substitute diagram derived from Fig. 3 for the purpose of explanation.

The division of current through the two parallel circuits is shown in the second equivalent circuit of Fig. 4. The total resistance parallel to the semiconductor internal resistance $Rt_1$ is denoted by RA. The total resistance parallel to the internal semiconductor resistance $Rt_2$ is denoted by RB. It is apparent that in the first parallel circuit, the current $i_t$ is equal to the sum of the two branch currents $i_1$ and $i_2$. Analogously, in the second parallel circuit, the total current $i_t$ is equal to $i_3$ plus $i_4$.

As mentioned, the base-emitter resistances $Rt_1$ and $Rt_2$ of the respective transistors are very sensitive to temperature. If one assumes that these resistances $Rt_1$ and $Rt_2$ change with temperature in exactly the same manner, which is not accurately so, it will be obvious that the distribution of current in the two sets of parallel circuits will not change by the same respective percentages unless the resistances RA and RB are equal.

It is the purpose of the resistor R11 (Figs. 1, 2) to make the two resistance values RA and RB substantially equal, in order to obtain a regulating network which is substantially insensitive to temperature changes of the transistors. As mentioned, the dynamic resistance Rz (Fig. 3) of the two Zener diodes D3A and D3B is quite small compared with the resistance of the voltage divider resistor R3. Consequently, in the regulating network the value of the parallel resistance RB (Fig. 4) across the semiconductor internal resistance $Rt_2$ would be much smaller than the resistance RA if the additional resistance of resistor R11 were not added. Resistor R11 is so dimensioned that Rz plus R11 is essentially equal to the resistance of R3, thus causing RA and RB to be equal.

Reverting now to Fig. 1, it will be noted that a third transistor Q3 is connected parallel to the one transistor Q1 which is driven by variable control voltage dependent upon any variation in bus voltage of the battery charger. The transistor Q3 is preferably matched with transistors Q1 and Q2, and is normally biased to cut-off so as to remain non-conductive during normal operation of the battery charger. Consequently, the presence of the parallel transistor Q3 does not interfere with the above-described voltage regulating performance of transistors Q1 and Q2. However, as will be explained, the transistor Q3 is so controlled in response to the current transferred by the power rectifier as to impose upon the regulating system an overriding current-limit control in the event the load imposed upon the power rectifier exceeds a predetermined value.

For the purpose of such current-limit control, the primary winding 1T2 of a current transformer T2 is interposed between the secondary winding of transformer T1 and one of the bridge feed points F1 of the magnetic amplifier. The secondary winding 2T2 of current transformer T1 has a midtap to which an adjustable resistor R10 is connected. The other end of resistor R10 is connected with the end points of the secondary winding 2T2 through respective diodes D2A and D2B consisting of solid-state rectifiers. Since the primary 1T2 is directly in series with the secondary of transformer T1, the alternating current through winding 1T2 is directly proportional to the direct load current supplied by the charger, and the voltage in the secondary winding 2T2 is also proportional to that load current. The secondary 2T2, the resistor R10 and the diodes D2A, D2B form a center-tapped rectifier circuit whose rectified output voltage appears across the active portion of resistor R10 and is filtered by means of a capacitor C2. The direct-current voltage across resistor R10 is proportional to the direct current drawn from the battery charger. One end of resistor R10 is connected to the base of the transistor Q3. The other end of resistor R10 is connected by lead LP to the positive bus P of the charger.

For explaining the operation of the transistor Q3, assume at first that the transistor Q1 is removed from the regulating system. Then we can describe a second equilibrium condition with reference to the voltage across resistor R10 and the Zener voltage across the diodes D3A, D3B. Again assuming that the total Zener voltage is 10 volts and that substantially the same voltage appears across the common emitter resistor R7 of transistors Q2 and Q3, the regulating system would function to hold the voltage across the resistor R10 at 10 volts, i.e. equal to the Zener voltage, and thus would hold the current output of the power rectifier at a constant value. This would be done by controlling the control windings 2M1, 2M2 and 3M1, 3M2 of the magnetic amplifier in the same manner as the amplifier was controlled by the same control windings for voltage regulation. If the current output of the charger were too high, the voltage across resistor R10 would increase and this would somewhat raise the base potential of transistor Q3 while lowering the base potential of transistor Q2. Consequently, the collector current of transistor Q3 passing through the windings 2M1 and 2M2 would have a higher magnitude than the current now flowing in the collector circuit of transistor Q2 and through the control windings 3M1, 3M2. As a result, the control windings would cause lowering the output of the battery charger as required to keep the output current constant at the value where the voltage across resistor R10 is equal to the Zener voltage.

Now, since the transistor Q1 is connected in the regulating circuit but has a higher base potential, i.e. a less positive potential, than the transistor Q3, the transistor Q3 remains cut off and is substantially inoperative in the regulating circuit under normal operating conditions. Only when the charger reaches a state where the voltage across resistor R10 is just slightly larger than the voltage across resistor R3, can the transistor Q3 assume control of the regulating network and make the transistor Q1 inoperative. That is, at this point the transistor Q1 is biased to cut-off, and the transistor Q3 cooperates with transistor Q2 to effect an overriding control for constant current.

Consequently, the combination of circuits is such that up to the point where the current-limiting regulation becomes operative, the battery charger has a strictly regulated voltage output, whereas at the point where the current limit performance becomes operative, the battery charger continues to operate as a current regulator, thus protecting the entire system, including the transistor circuits, from overloads.

It will be obvious to those skilled in the art that the invention permits of various modifications without departing from the essential features. For example instead of connecting the control winding or windings of the magnetic amplifier directly into the sum-current network, they may be indirectly connected with the network by inserting an intermediate amplifying stage preferably also comprising solid-state semiconductor devices exclusively. It will be understood therefore that the invention can be embodied in devices other than particularly illustrated and described herein witthout departing from the scope of the claims annexed hereto.

What is claimed is:

1. A battery charger comprising alternating-current supply means, a rectifying magnetic amplifier connected to said supply means and having respective positive and negative buses for constant direct-current output voltage, said magnetic amplifier having two control windings of mutually opposed inductive relation for jointly regulating said output voltage, a sum-current network comprising two transistors having respective collectors connected through said respective windings with one of said buses and having respective emitters which are both connected to said other bus, a common emitter resistor serially interposed between said latter bus and said two emitters, a source of constant reference voltage, a compensating resistor, one of said transistors having its base connected through said compensating resistor and said source to said other bus, a voltage divider extending between said buses and having a divider point of voltage substantially equal to said reference voltage when the bus voltage has the correct value, said other transistor having its base connected to said divider point, the respective total external resistances of the two base-emitter circuits thus formed being substantially equal due to the resistance of said compensating resistor, whereby said network regulates said magnetic amplifier for constant output voltage irrespective of temperature-responsive resistance changes of said transistors.

2. A battery charger comprising alternating-current supply means, a rectifying magnetic amplifier connected to said supply means and having respective positive and negative buses for constant direct-current output voltage, said magnetic amplifier having two control windings of mutually opposed inductive relation for jointly regulating said output voltage, a sum-current network comprising two transistors having respective collectors connected through said respective windings with one of said buses and having respective emitters which are both connected to said other bus, a common emitter resistor serially interposed between said latter bus and said two emitters, a first voltage divider connected across said buses and comprising resistance means and solid-state diode means connected in series with each other to provide a constant reference voltage across said diode means, said diode means being electrically adjacent to said other bus, a compensating resistor, one of said transistors having its base connected through said compensating resistor and said diode means to said other bus, a second voltage divider connected across said buses and having a divider point of voltage substantially equal to said reference voltage when the bus voltage has the correct value, said other transistor having its base connected to said divider point, the respective total external resistances of the two base-emitter circuits thus formed being substantially equal due to the resistance of said compensating resistor, whereby said network regulates said magnetic amplifier for constant output voltage irrespective of temperature changes of said transistors.

3. A regulated rectifying apparatus comprising alternating-current supply means, a rectifying magnetic amplifier connected to said supply means and having respective positive and negative buses for constant direct-current output voltage, said magnetic amplifier having two control windings of mutually opposed inductive relation for jointly regulating said output voltage, a sum-current network comprising two transistors having respective collectors connected through said respective windings with said positive bus and having respective emitters connected to said negative bus, a common emitter resistor being serially interposed between said two emitters and said negative bus, a first voltage divider comprising diode means connected to said negative bus and resistance means series connected between said diode means and said positive bus to provide a constant reference voltage across said diode means, a compensating resistor, one of said transistors having its base connected through said compensating resistor and said diode means to said other bus, a second voltage divider connected across said buses and having a divider point of voltage substantially equal to said reference voltage when the bus voltage has the correct value, said other transistor having its base connected to said divider point, the respective total external resistances of the two base emitter circuits thus formed being substantially equal due to the resistance of said compensating resistor, whereby said network regulates said magnetic amplifier for constant output voltage irrespective of temperature changes of said transistors.

4. A regulated rectifying apparatus comprising a solid-state power rectifier having an alternating-current input circuit and two direct-current output buses, said power rectifier having two rectifier control circuits for differential control of said rectifier, a control network comprising a first transistor and a second transistor having respective collectors connected through said two control circuits with the positive bus and having respective emitters connected to said negative bus, a common emitter resistor being serially interposed between said two emitters and said negative bus, a source of constant reference voltage, a voltage divider extending between said buses and having a divider point of voltage substantially equal to said reference voltage when the bus voltage has the correct value, said first transistor having its base connected to said divider point, said source of constant reference voltage smaller than the bus voltage, a compensating resistor, said second transistor having its base connected through said compensating resistor and said source to said negative bus, the respective total external resistances of the two base-emitter circuits thus formed being substantially equal due to the resistance of said compensating resistor, whereby said network regulates said power rectifier for constant bus voltage irrespective of temperature-responsive changes in internal resistance of said transistors.

5. A regulated rectifying apparatus according to claim 4, comprising a normally inactive, third transistor connected in parallel with said first transistor and having an emitter connection in common therewith, said third transistor comprising a base-emitter circuit having a cut-off bias voltage, and current-responsive circuit means coupling said latter circuit with said power rectifier for rendering said third transistor conductive in response to the load current of said rectifier passing beyond a given value, whereby said third transistor and said second transistor jointly operate to limit the load current of the apparatus.

6. A regulated rectifying apparatus according to claim 4, comprising a normally inactive, third transistor connected in parallel with said first transistor and having an emitter connection in common therewith, a current transformer connected in said input circuit, auxiliary rectifier means connected with said transformer and a reference resistor connected with said auxiliary rectifier to be energized therefrom by direct voltage dependent upon the load current of said power rectifier, said third transistor having a base-emitter circuit extending in series through said reference resistor and said common emitter resistor with said latter two resistors poled in voltage opposition, said reference resistor having in said latter base-emitter circuit a voltage drop substantially balancing the voltage drop of said common emitter resistor when the bus voltage has the correct value, whereby said third transistor is normally inactive but imposes an overriding current-limiting control upon said power rectifier when said load current exceeds a given value.

7. In rectifying apparatus according to claim 6, said current transformer having a mid-tapped secondary winding, said reference resistor having one end connected to the mid-tap of said winding, two diodes connected between the other end of said reference resistor and the respective ends of said winding to impose rectified voltage upon said reference resistor, and a capacitor connected across said reference transistor so as to have one electrode in connection with said negative bus.

References Cited in the file of this patent
UNITED STATES PATENTS
2,759,142   Hamilton _____ Aug. 14, 1956